United States Patent [19]
Kubota et al.

[11] Patent Number: 5,385,055
[45] Date of Patent: Jan. 31, 1995

[54] ELECTROMAGNETIC FLOWMETER

[75] Inventors: Yousuke Kubota, Tokyo; Toshikazu Hatake, Kanagawa; Takuya Iijima, Tokyo, all of Japan

[73] Assignee: Kabushiki Kaisha Toshiba, Kanagawa, Japan

[21] Appl. No.: 10,323

[22] Filed: Jan. 28, 1993

[30] Foreign Application Priority Data

Jan. 31, 1992 [JP] Japan .................. 4-016257
Dec. 9, 1992 [JP] Japan .................. 4-329551

[51] Int. Cl.⁶ ............................................. G01F 1/58
[52] U.S. Cl. ............................. 73/861.12; 73/861.08
[58] Field of Search ............ 73/861.08, 861.11, 861.12

[56] References Cited

U.S. PATENT DOCUMENTS

| B1 4,420,982 | 4/1991 | Schmoock | 73/861.12 |
| 3,610,040 | 3/1970 | Wada | 73/861.12 |
| 3,635,082 | 1/1972 | Prellwitz et al. | 73/861.06 X |
| 3,695,104 | 10/1972 | Mannherz et al. | 73/861.12 |
| 3,824,856 | 7/1974 | Yard | 73/861.12 |
| 3,981,190 | 9/1976 | Vidmantas | 73/861.12 |
| 4,497,212 | 2/1985 | Schmoock | 73/861.12 |
| 4,635,486 | 1/1987 | Jacobsen et al. | 73/861.12 |
| 4,641,536 | 2/1987 | Jacobsen et al. | 73/861.12 |

FOREIGN PATENT DOCUMENTS

| 2040682 | 2/1972 | Germany . |
| 51-55653 | 4/1976 | Japan . |
| 51-57160 | 5/1976 | Japan . |
| 51-22835 | 7/1976 | Japan . |
| 1424875 | 2/1976 | United Kingdom . |

*Primary Examiner*—Richard E. Chilcot, Jr.
*Assistant Examiner*—Elizabeth L. Dougherty
*Attorney, Agent, or Firm*—Finnegan, Henderson, Farabow, Garrett & Dunner

[57] ABSTRACT

An electromagnetic flowmeter comprises a cylindrical support. A pair of coils are positioned at the outer surface of the cylindrical support, spaced approximately 180° apart. The cylindrical support is coaxially mounted within a cylindrical magnetic path, which defines a space for the coils between the magnetic path and the cylindrical support. The magnetic path has two ends, each engaged by a flange. The flanges include bosses, which together with the cylindrical support and magnetic path serve to position the coils. A conduit is mounted within the support, and a housing encloses the support, the coils, and the conduit. The length of the housing is greater than the length of the conduit, defining a gap between the housing and the conduit.

22 Claims, 16 Drawing Sheets

ELECTROMAGNETIC FLOWMETER

BACKGROUND OF THE INVENTION

1. Field of the Invention

This invention relates to electromagnetic flowmeters, and more particularly to a flowmeter having a cylindrical housing and having components integrated to mitigate many types of stress.

2. Description of the Related Art

Electromagnetic flowmeters are typically inserted between two flanges of a pipe to measure a volume of fluid flowing through the pipe. Examples of known electromagnetic flowmeters will be described with reference to FIGS. 1, 2 and 3.

One known flowmeter is shown in FIG. 1. This electromagnetic flowmeter generally comprises a conduit 1, which provides a path for a fluid, and a pair of coils 2a and 2b provided on the outer surface of conduit 1. The coils 2a and 2b are compressed by a core portion 5 to define a magnetic path. The core 5 is connected to the conduit 1 studs 3 and screws 4. Electrodes 6a and 6b protrude through oppositely disposed apertures in the conduit 1.

Another known flowmeter is shown in FIG. 2. In this example, the coils 2a and 2b are fixed in place by the cores 5a and 5b, which are connected at opposing end portions by screws 7a and 7b.

However, in the examples described above, as the cores 5a and 5b are compressed by the screws 4, or 7a and 7b, a compressive stress is generated which causes the shape of cores 5a and 5b and conduit 1 to partially deform. This deformation is a problem, because the resultant restriction of the flow path renders it difficult to measure the amount of fluid flow with the necessary degree of precision.

Another known electromagnetic flowmeter is shown in FIG. 3. This type of flowmeter is disclosed in U.S. Pat. No. 4,420,982. In this example, it can be seen that conduit 1 has end faces. When the flowmeter is installed between two pipe flanges 29 and 30, by bolts and nuts 8, a compressive force is applied in the axial direction of the flowmeter by pipes 9a and 9b, compressing both conduit 1 and a core portion 5. The conduit 1, in particular, must be designed with sufficient strength, or else be provided with some type of stiffening liner, in order to withstand this compressive force. This results in the flowmeter becoming more expensive to manufacture.

Further it is important that coils 2a and 2b be positioned against the conduit at the proper spacing relative to one another in order to measure the amount of flow of the fluid accurately. However, when assembling a flowmeter having the configuration shown in FIGS. 1 and 2, it is difficult to position coils 2a and 2b properly without specific tools and skilled labor. This results in a significant increase in manufacturing time and expense.

SUMMARY OF THE INVENTION

It is therefore an object of the invention to provide an electromagnetic flowmeter which can measure the amount of fluid flow precisely, and which can be manufactured and assembled cheaply and easily.

To achieve the above and other objects, an electromagnetic flowmeter according to the present invention has a conduit having opposite tapered end portions and a middle portion, receiving and having passed therethrough a fluid, the rate of flow of which is to be measured. The flowmeter has a pair of electrodes positioned at opposite sides of the conduit. A magnetic field generating means, having a pair of coils and a core, generates a magnetic field in the conduit. Additionally, the flowmeter has a cylindrical case and a cylindrical housing. The cylindrical case surrounds the conduit and has a portion which mounts the magnetic field generating means in place. The cylindrical housing in turn surrounds the conduit, the magnetic field generating means and the cylindrical case. Preferably, the housing has a first length in the axial direction, and the conduit has a second length in the axial direction which is less than the first length. A gap is defined between the housing and the conduit. An elastic ring is positioned in the gap.

BRIEF DESCRIPTION OF THE DRAWINGS

The invention is described herein with reference to the figures in which.

DESCRIPTION OF THE PREFERRED EMBODIMENTS

Figure 1:
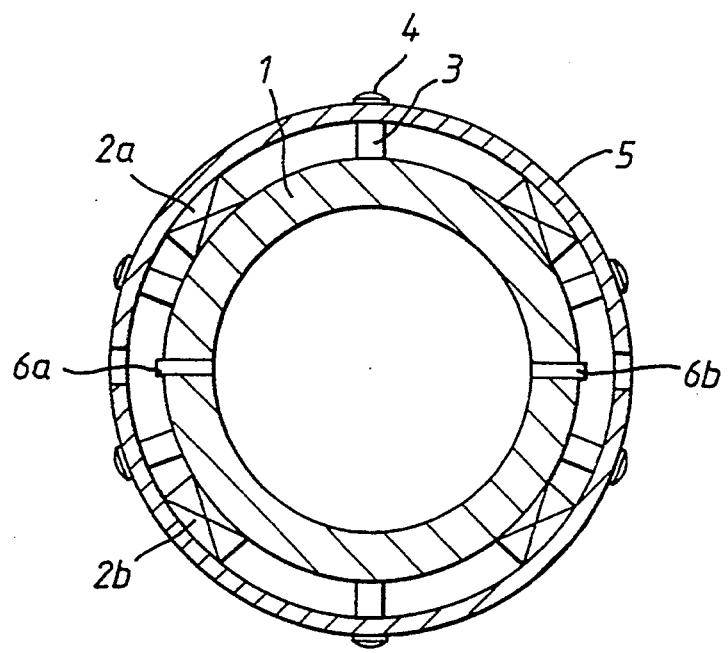
FIG. 1 is a sectional end view showing a known flowmeter.
Figure 2:
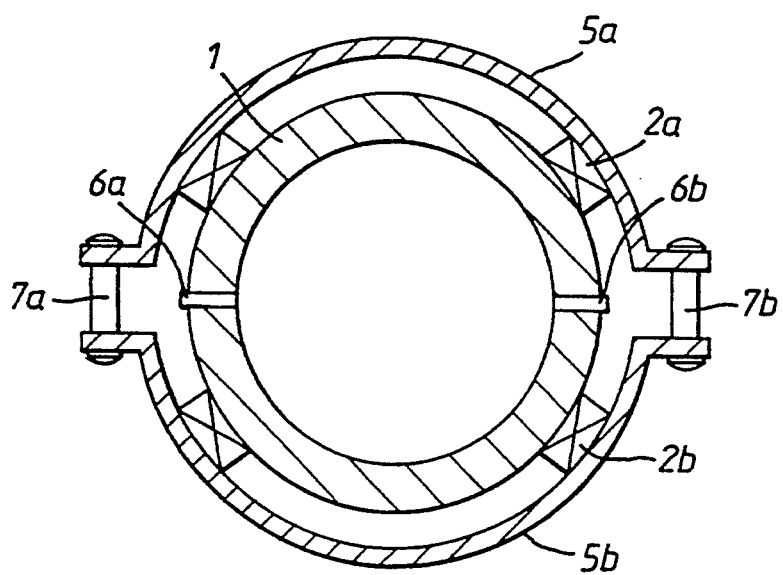
FIG. 2 is a sectional end view showing another known flowmeter.
Figure 3:
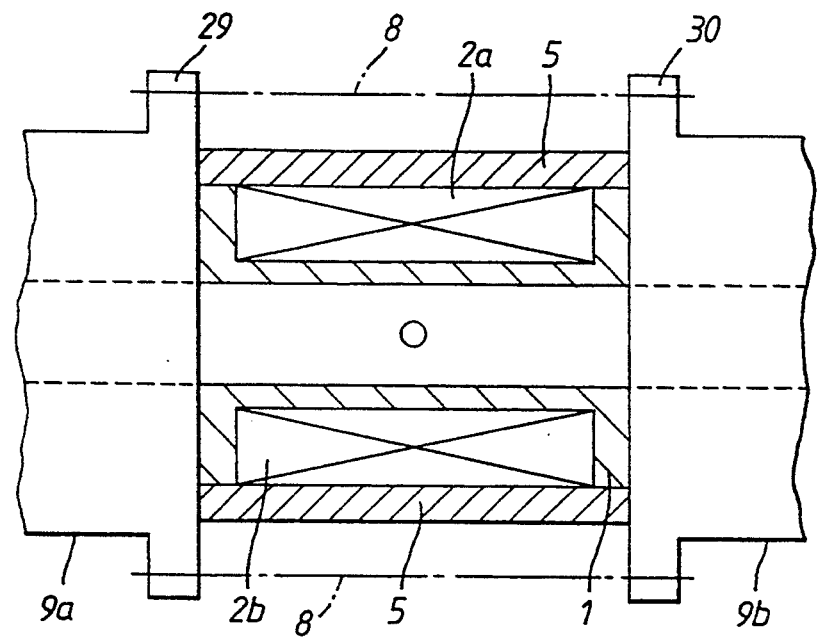
FIG. 3 is a sectional side view showing yet another known flowmeter.

As illustrated in FIGS. 4, 5(a), 5(b) and 6 a first embodiment of an electromagnetic flowmeter A according to the present invention comprises a cylindrical support or case 10. A pair of saddle-shaped coils 11, 12 are positioned on the outer surface of cylindrical support 10, spaced approximately 180° apart from one another.

A ceramic conduit 13 is coaxially disposed within the cylindrical support 10. The ceramic conduit 13 has opposite tapered end portions 13a and 13b, and a middle portion 13c. The tapered end portions 13a and 13b each have an end face, 13d and 13e respectively. Further, the conduit 13 includes a recessed portion 13f. The recessed portion 13f is provided to make it easier to slide the ceramic conduit 13 into the support 10. Moreover, the conduit 13 has apertures 13g to receive electrodes 14a and 14b.

The end faces 13d and 13e each include a tapered corner and a short face. The outer diameter of conduit 13 varies. That is, the outer diameter of end portions 13a and 13b are greater than the outer diameter of middle portion 13c. However, the inner diameter of conduit 13 is uniform throughout its length.

Electrodes 14a and 14b protrude through oppositely disposed apertures 13g in conduit 13 and through holes 10b in cylindrical support 10.

The cylindrical support 10 is coaxially mounted within a cylindrical magnetic path 16, which defines an open space between magnetic path 16 and cylindrical support 10. The magnetic path 16 has two ends. One end of magnetic path 16 is engaged by a flange 10a of support 10. The other end of magnetic path 16 is engaged by another flange 17 of support 10. Further, the magnetic path 16 has holes 16a through which the electrodes 14a and 14b are inserted. The flanges 17 and 10a each have tapered portions 25 at one of their corners. The flanges 17 and 10a also include bosses 18, the function of which is described below. The open space between magnetic path 16 and cylindrical support 10 is filled with an injected plastic mold.

The magnetic path 16 is coaxially mounted within a cylindrical housing 19, preferably made of Type 304 stainless steel or an equivalent material, which surrounds and protects the magnetic path 16, saddle-shaped coils 11, 12, cylindrical support 10 and conduit 13. Each end of housing 19 is partially closed by an annular flanges 19a and 22, respectively. The flanges 19a and 22 include recesses 24a and 24b, respectively. As embodied in FIGS. 4, 5(a), and 5(b), flanges 19a and 22 are positioned by bosses 18, and welded to the housing 19. With the flanges attached, the housing 19 has a selected length, which is greater than the length of conduit 13. The positioning of bosses 18 in flanges 19a and 22 functions to set magnetic path 16, cylindrical support 10, and electrodes 11 and 12 in position.

Each flange 19a and 22 has an extending lip 23, having an inner face. Each extending lip 23 defines an opening having a diameter which generally matches the inner diameter of conduit 13, defining a flow path therethrough. In this embodiment, the inner diameter is 50 mm.

Between each inner face of extending lip 23 of flanges 19a and 22, and the end faces 13d and 13e of conduit 13, there is a gap of approximately 0.5 mm. O-rings 20a and 20b are provided between flanges 19a and 22 and end portions 13a and 13b, respectively, of conduit 13. Similar O-rings 21a and 21b are provided between conduit 13, flanges 17 and 10, and flanges 22 and 19a, respectively. The O-rings provide a water-tight seal in the assembled electromagnetic flowmeter, and help maintain the spacing between the conduit and other components.

The conduit 13 is not physically joined to housing 19. The conduit 13 is maintained in its position by the presence of annular flanges 19a, 22, and O-rings 20a and 20b. Likewise, conduit 13 is spaced from flanges 17 and 10a, and flanges 22 and 19a, by O-rings 21a and 21b.

Figure 4:
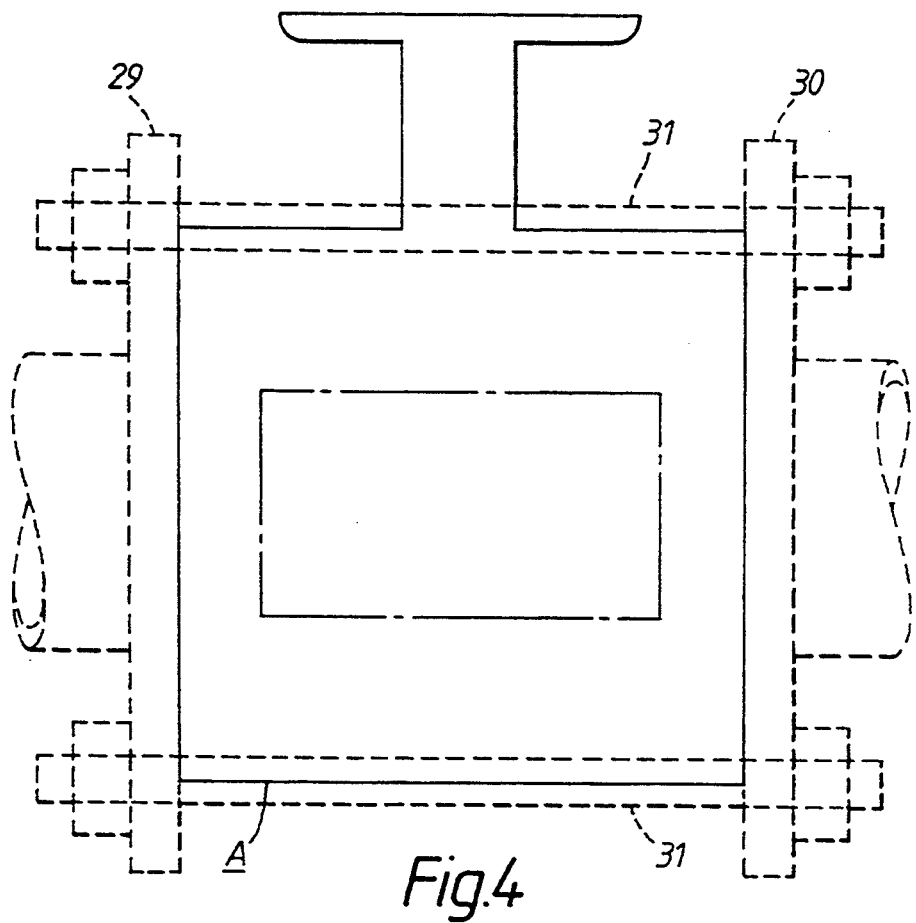
FIG. 4 is a schematic side view broadly showing a first embodiment of the present invention.

The length of conduit 13 is shorter than the length of housing 19 by the width of extending lips 23 of the annular flanges, and by the 0.5 mm gaps. As shown in FIG. 4, the electromagnetic flowmeter in this embodiment is mounted between opposing pipe flanges 29 and 30 of a pipe. Bolts 31 pass between the pipe flanges. Compressive forces created by the torque of the bolts are applied via the pipe flanges 29, 30 to the flanges 19a and 22, which are welded to the housing 19.

In operation, fluid flows through the electromagnetic flowmeter via the pipes, the openings in annular flanges 19a and 22, and the conduit 13. The amount of flow is measured by the flowmeter according to known principles.

The end faces 13d and 13e of conduit 13 do not abut flanges 29, 30, or the inner surface of extending lip 23 of annular flanges 19a and 22. Thus, the axial compressive force of the pipe flanges 29 and 30, under normal operating conditions should be absorbed by housing 19 via annular flanges 19a and 22. Likewise, any compressive force applied to housing 19 in a direction transverse to the axial direction should be absorbed by housing 19, magnetic path 16, and cylindrical casing 10. Under normal operating loads, no compressive force is absorbed by the ceramic conduit 13. Hence, no compression or deformation of conduit 13 should occur.

The inventors have calculated the change in the axial length of the flowmeter housing caused by application of the axial compressive force by the pipe flanges. According to the calculation, the maximum reduction in housing length, which would be caused by excessive force (i.e. greater than normal operating force) is 0.16 mm. Because the compressive force is applied at each end of the housing 19, an approximate length reduction of 0.08 mm would occur at each end of the housing 19. However, since the ends of conduit 13 are separated from the inner surface of the housing flanges by a gap of 0.5 mm, the housing flanges still should not come into contact with the ends of the conduit. Therefore, it appears that under normal operating conditions, all of the compressive force applied by the pipe flanges will be absorbed by the housing, and none of the compressive force will be shared with the conduit 13.

Figure 7:
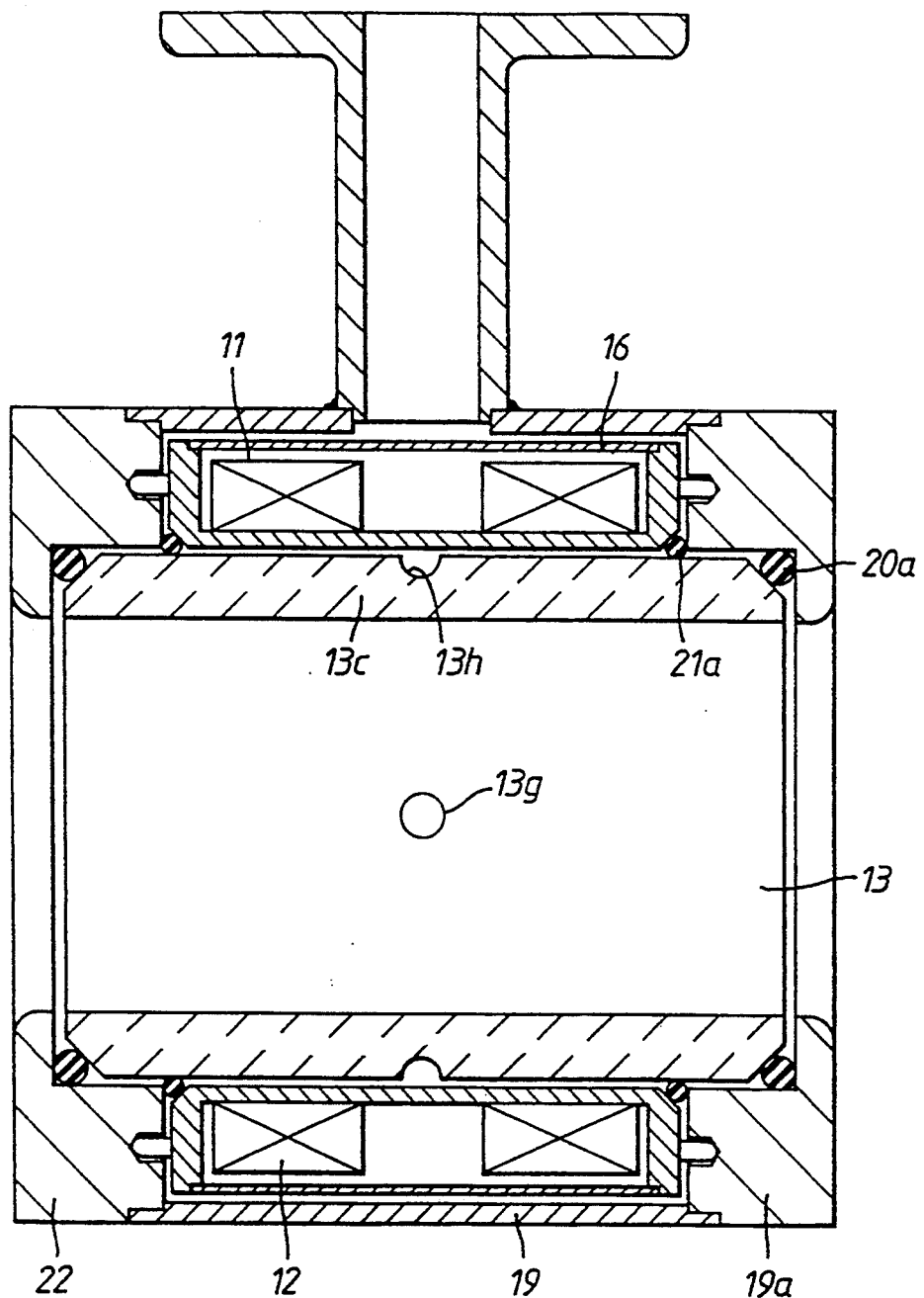
FIG. 7 is a sectional side view showing a second embodiment of the present invention.

A second embodiment will be described with reference to FIG. 7. The second embodiment is similar to the first embodiment, as described above, with one exception.

In the first embodiment, the conduit 13 includes middle portion 13c having an external diameter which is smaller than the external diameter of end portions 13a and 13b. The middle portion 13c extends for a substantial portion of the overall length of conduit 13 in the electromagnetic flowmeter shown in FIG. 5(a). In contrast, in the second embodiment of an electromagnetic flowmeter depicted in FIG. 7, the conduit 13 includes a groove 13h in middle portion 13c, of reduced external diameter, which extends for only a very minor portion of the overall length of conduit 13. The groove 13h is used for placement of wire leads.

A third embodiment of this invention will be described with reference to FIGS. 8 and 9. The third embodiment is similar to the first embodiment with one significant exception.

In the first embodiment, as described above, annular flanges 19a and 22 are welded to the housing 19. In contrast, the electromagnetic flowmeter broadly depicted in the embodiment of FIG. 8 includes a two piece annular flange at each end. As shown in FIGS. 8 and 9 each flange includes an inner ring 40 having bottom openings 40a for bolts 42 and an outer or ground ring 41. The ground ring 41 is bolted to the inner ring 40 with bolts 42. The inner ring 40 in turn is positioned by the bosses 18, and welded to the housing 19. In this embodiment, the ground ring 41 takes the place of the extending lip 23 shown in FIG. 5(a). The ground ring 41 has an inner surface. A 0.5 mm gap is provided between end faces 13d and 13e of conduit 13 and the inner surface of each ground ring 41.

Figure 5A:
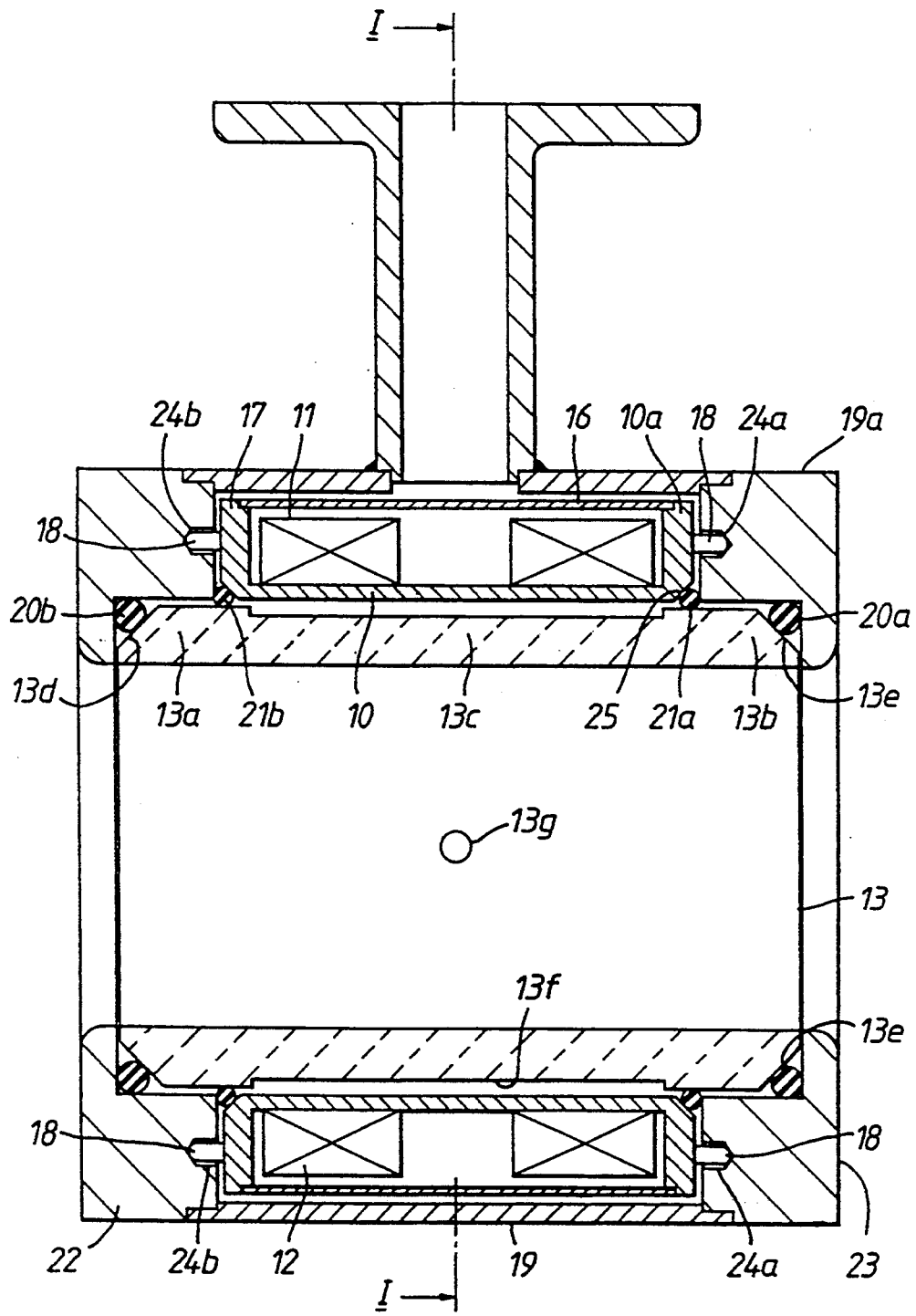
FIG. 5(a) is a sectional side view of the embodiment of FIG. 4.
Figure 5B:
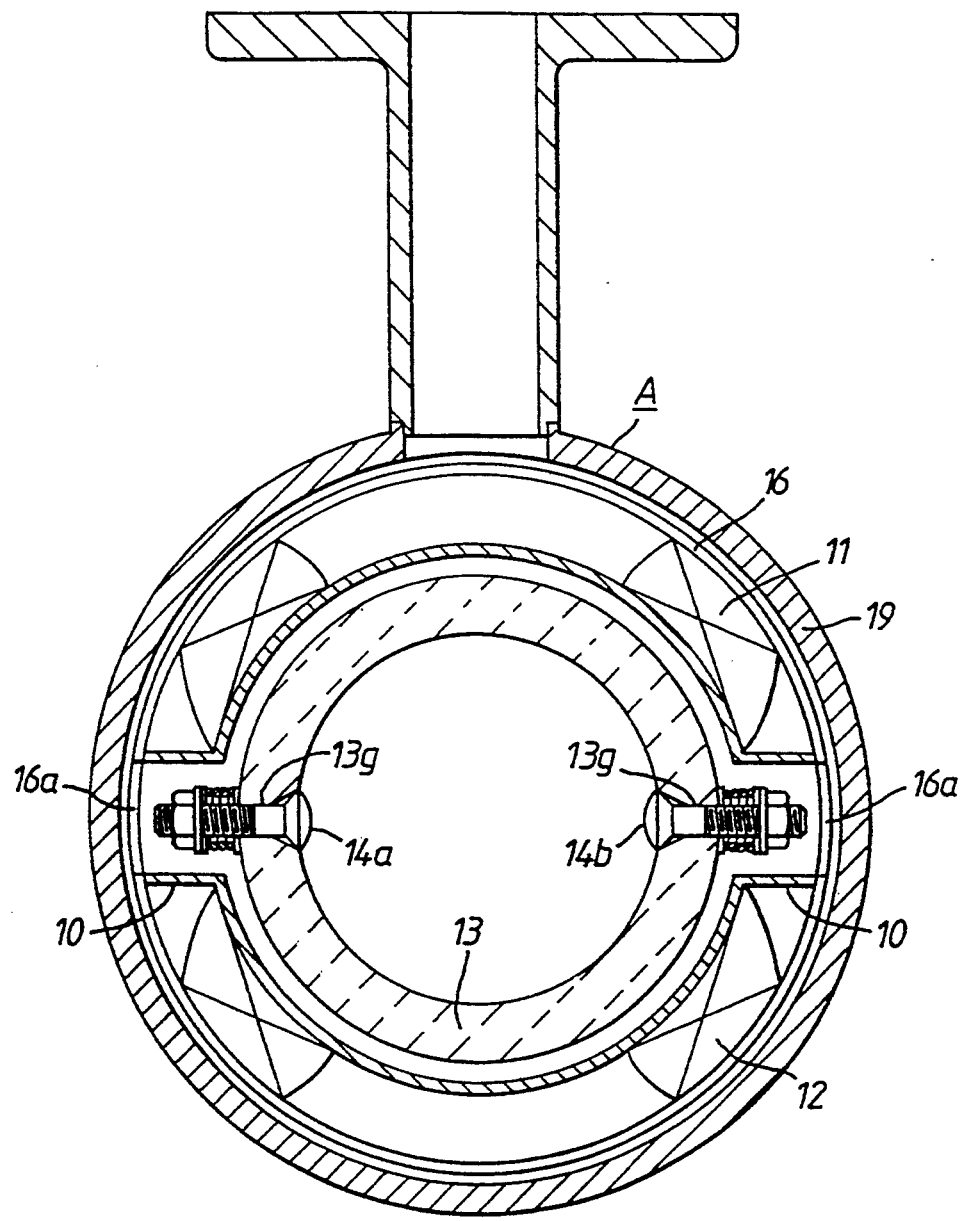
FIG. 5(b) is a sectional end view taken along line I—I of FIG. 5(a)
Figure 6:
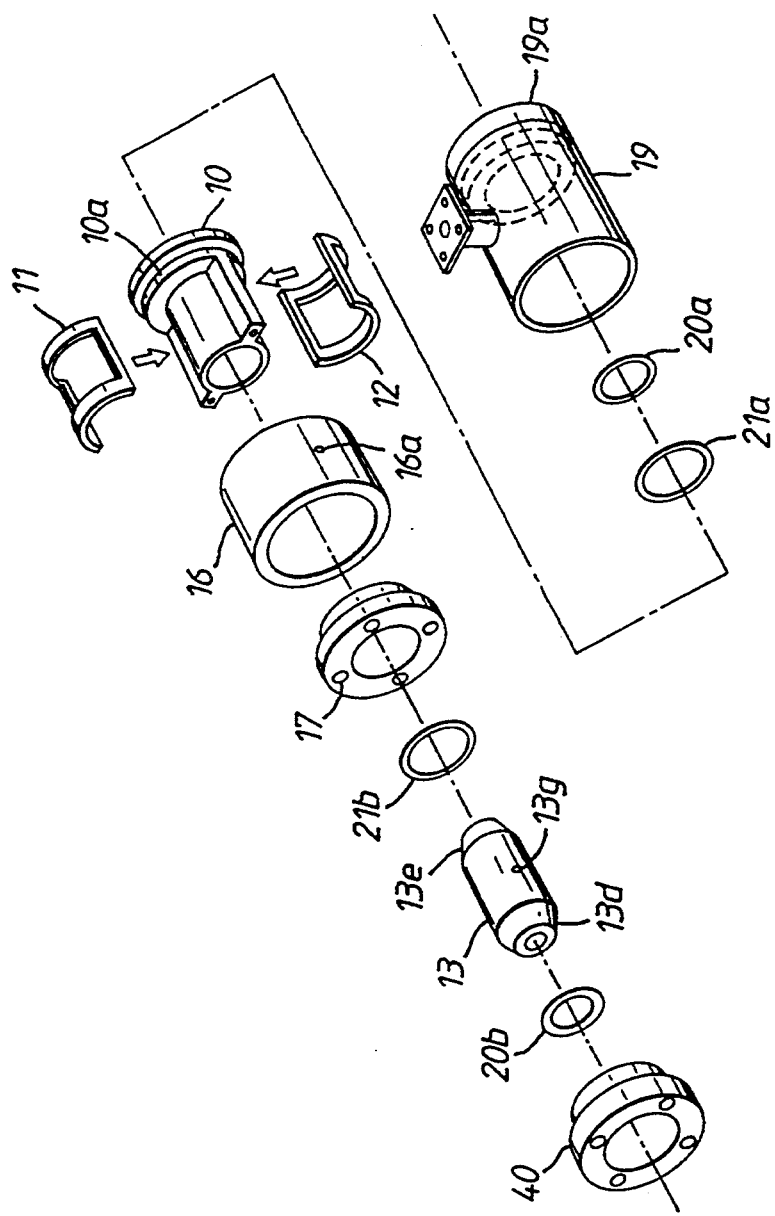
FIG. 6 is an exploded perspective view of the embodiment of FIG. 4.
Figure 8:
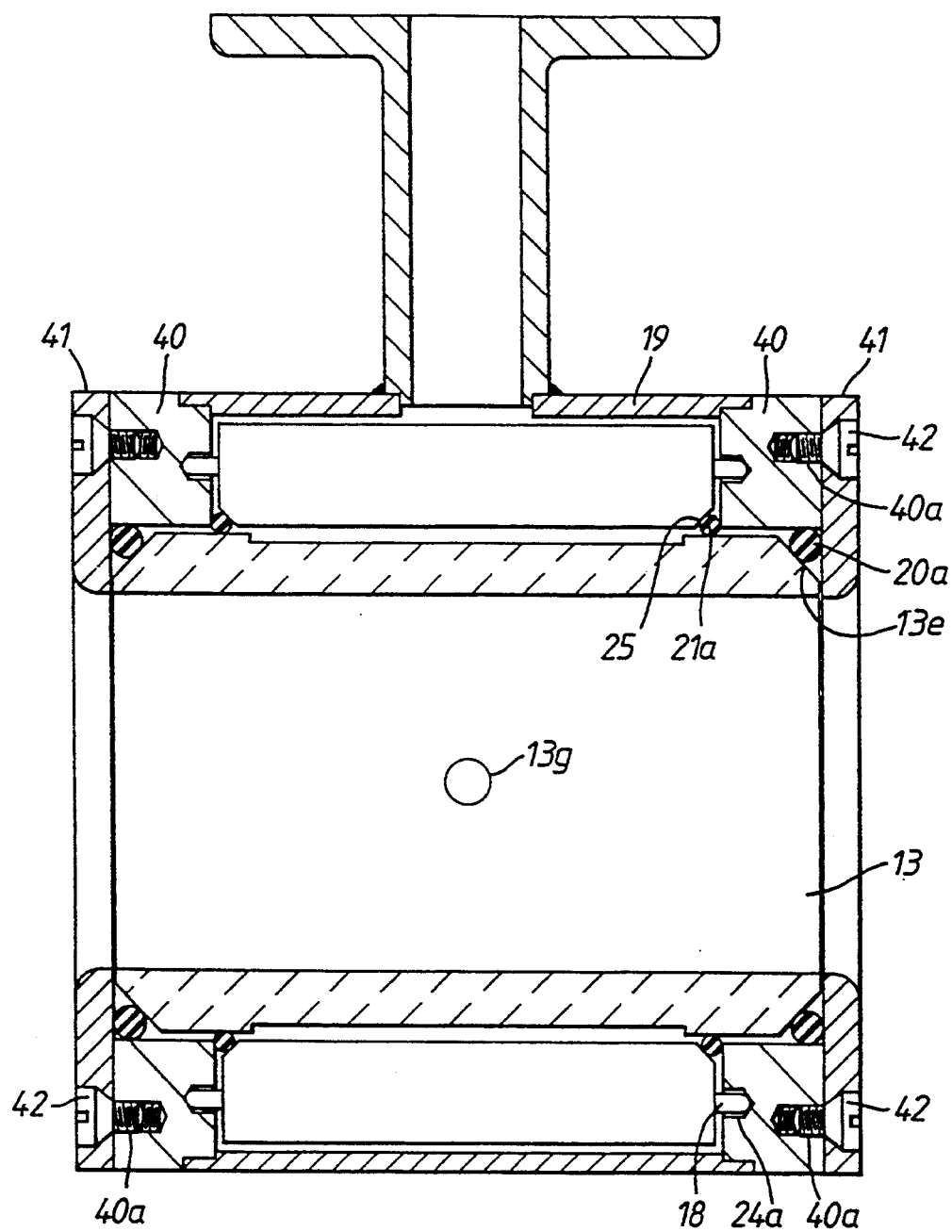
FIG. 8 is a sectional side view showing a third embodiment of the present invention.
Figure 9:
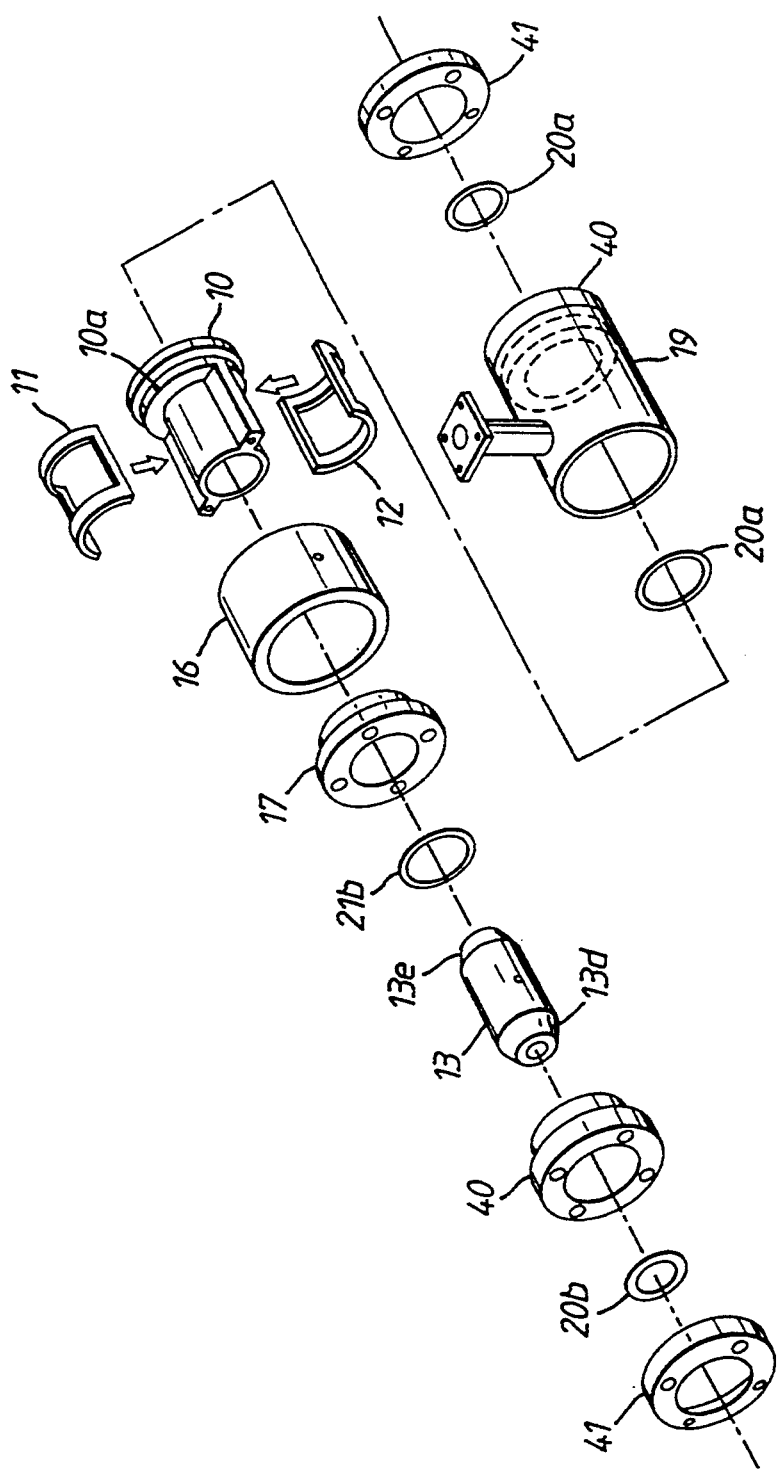
FIG. 9 is an enlarged perspective view of the embodiment of FIG. 8.

In operation, the embodiment of FIG. 8 differs from the embodiment of FIG. 5(a) only in that the outer surface of each ground ring 41 abuts against the pipe flanges 29 and 30. Hence, the axial compressive force transmitted via the pipe flanges 29 and 30 is absorbed by the ground ring 41, inner ring 40, and housing 19. Under normal loads, no compressive force is transmitted to or absorbed by ceramic conduit 13.

An alternate embodiment of the third embodiment is possible. In the alternative configuration, which is not shown, the ground ring 41 can be removed from the inner ring 40 by removing the bolts 42.

When the alternate embodiment is inserted between pipe flanges 29 and 30, the outer faces of inner rings 40, and O-rings 20a and 20b, abut against the surface of pipe flanges 29 and 30. The end faces 13d and 13e of ceramic conduit 13 still do not abut against pipe flanges 29 and 30. The end faces 13d and 13e of conduit 13 are separated from the surface of flanges 29 and 30 approximately by the length of the aforementioned 0.5 mm gap.

Removing the ground ring also effectively shortens the length of the housing by an amount equal to the thickness of the ground ring. The overall length of the housing is only greater than the length of the conduit by approximately 1 mm (i.e. 2×0.5 mm gap).

Figure 10A:
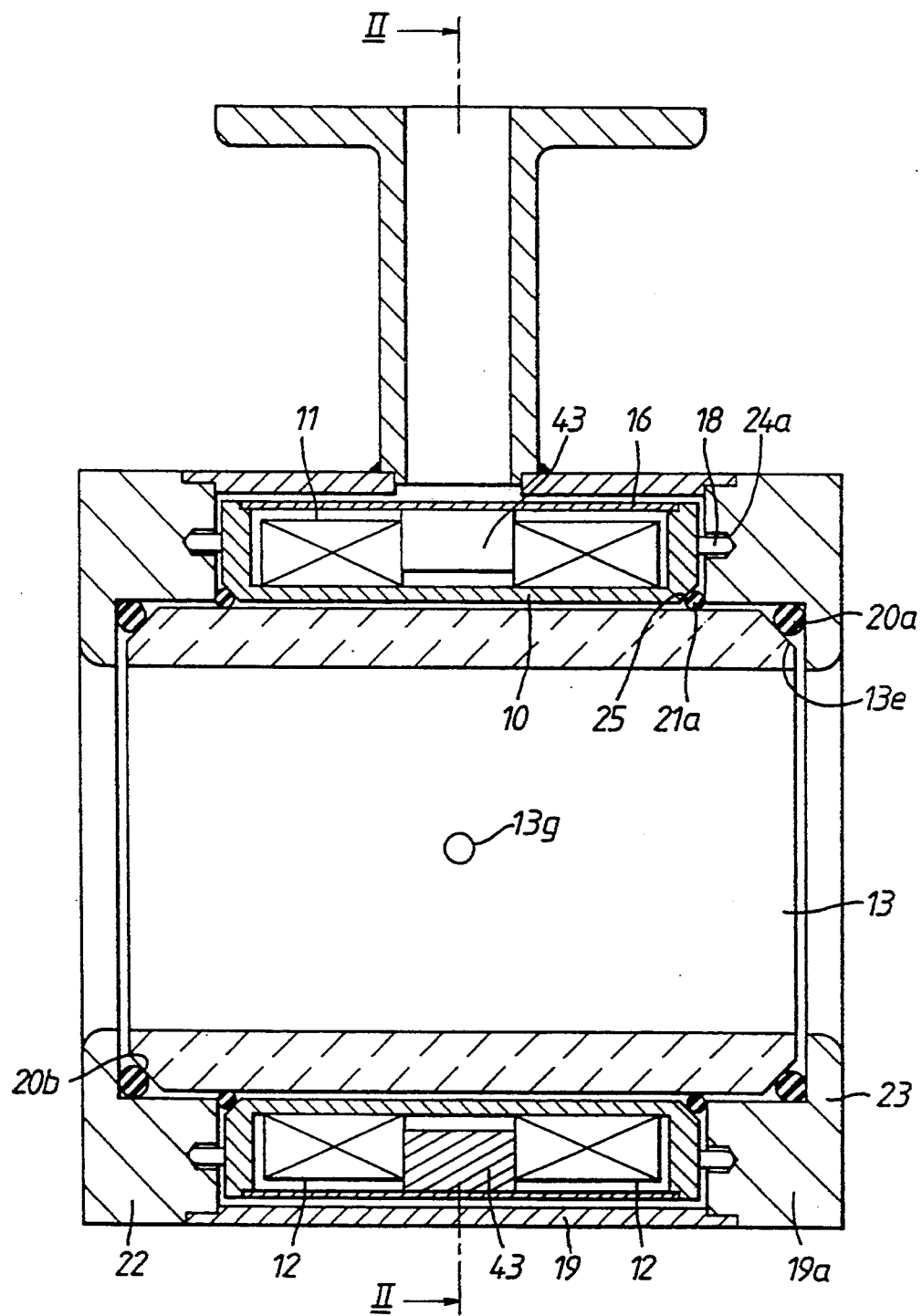
FIG. 10(a) is a sectional side view showing a fourth embodiment of the present invention.
Figure 10B:
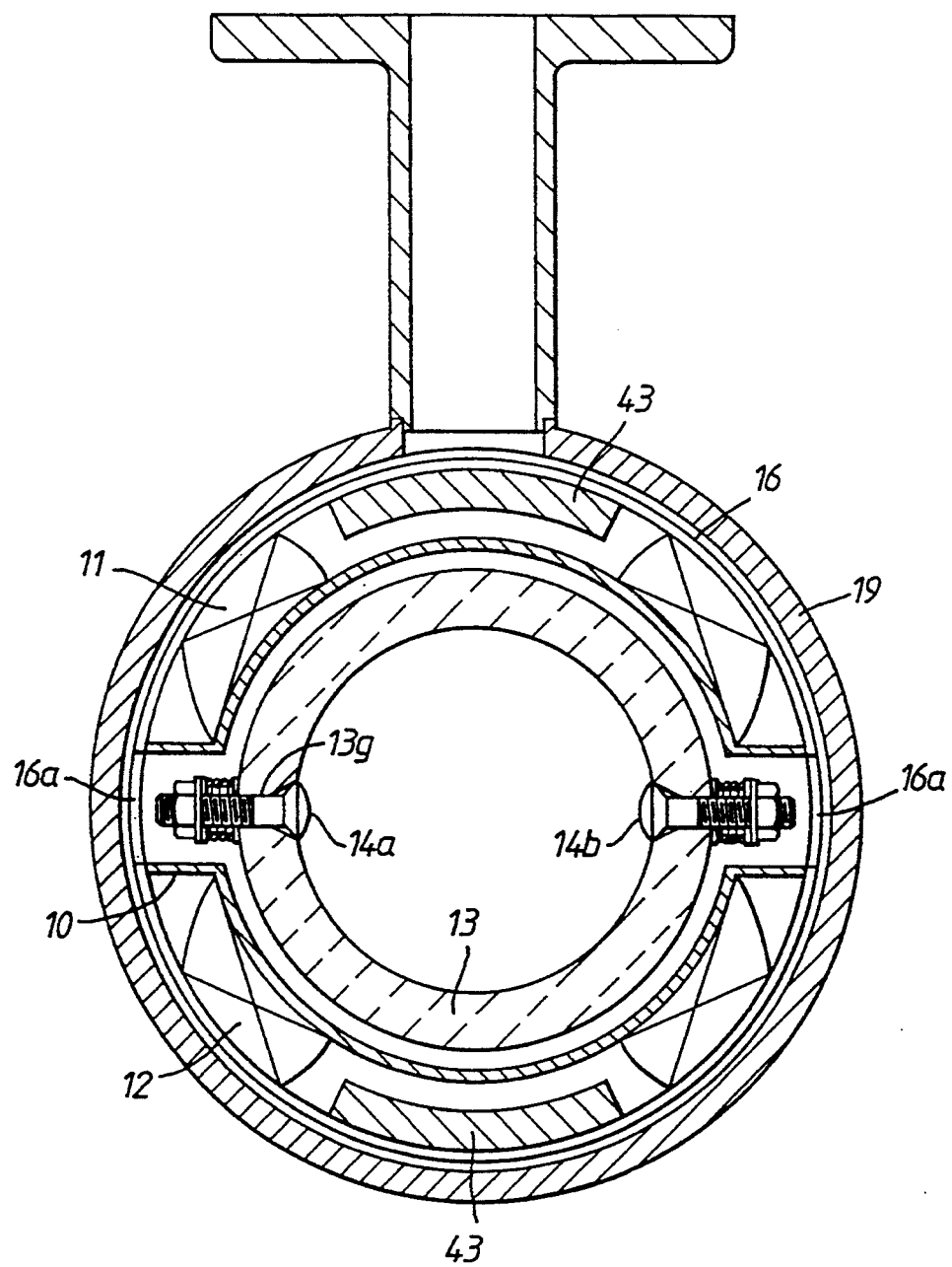
FIG. 10(b) is a sectional end view taken along line II—II of FIG. 10(a)

A fourth embodiment will be described with reference to FIGS. 10(a) and 10(b). The fourth embodiment is similar to the second embodiment with one exception.

The exception is that, in the fourth embodiment, coils 11 and 12 are wrapped around respective cores 43, which are formed of a ferromagnetic material.

Figure 11A:
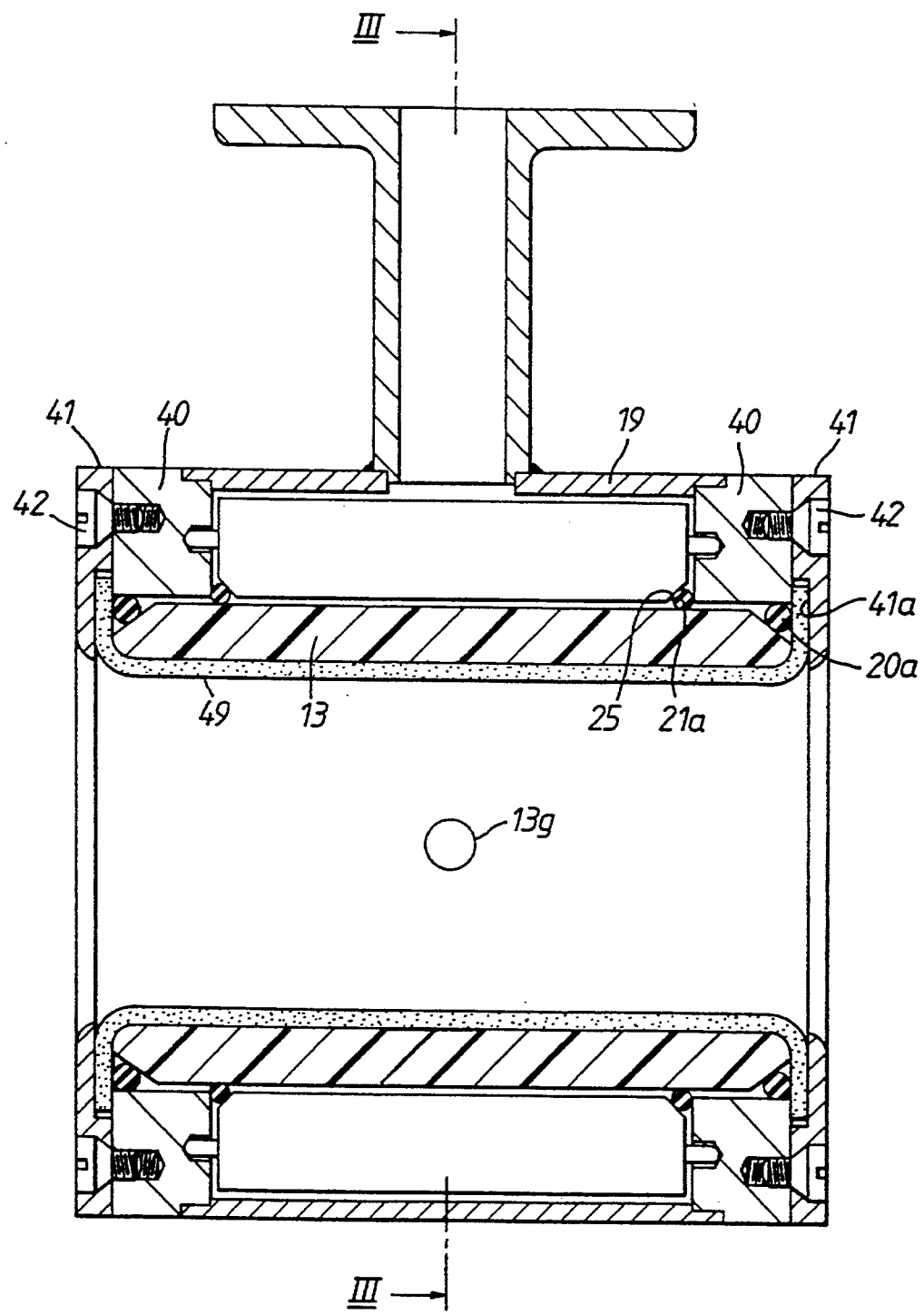
FIG. 11(a) is a sectional side view showing a fifth embodiment of the present invention.
Figure 11B:
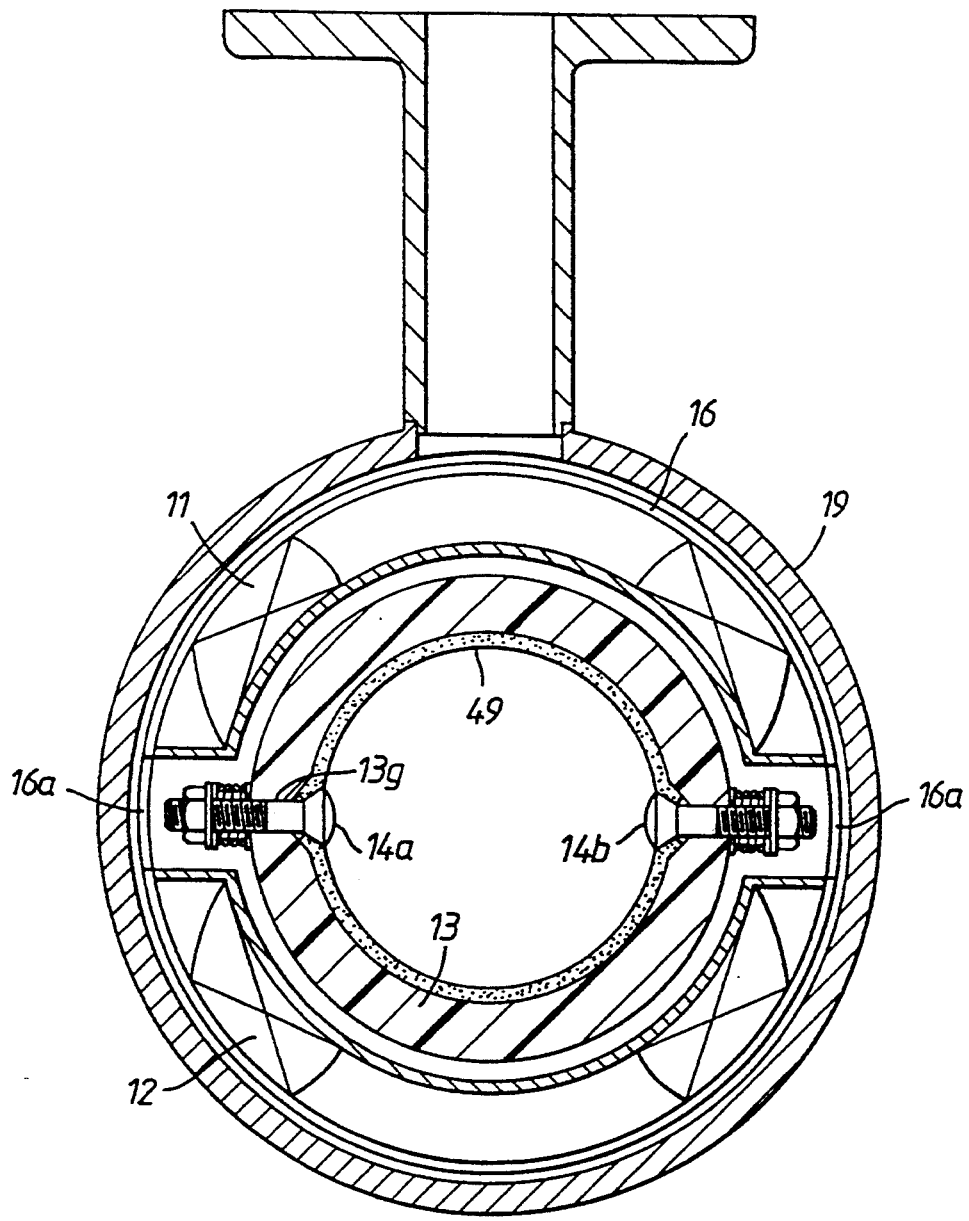
FIG. 11(b) is a sectional end view taken along line III—III of FIG. 11(a).

A fifth embodiment will be described with reference to FIGS. 11(a) and 11(b). The fifth embodiment has a housing with end flanges and ground rings. In this respect, it is similar to the third embodiment.

However, unlike the previous embodiments, the conduit 13 of this embodiment is not made of ceramic material. The conduit 13 can be made, for example, of plastic or any number of like materials.

In order to protect the non-ceramic conduit 13 from the effects of corrosive fluid passing through the conduit 13, a protective lining 49, for example a teflon lining, is provided to cover the inner surface of the conduit 13. The ends of teflon lining 49 are anchored in the gap between a step portion 41a of the ground ring 41 and inner ring 40 of the end flanges.

Figure 12:
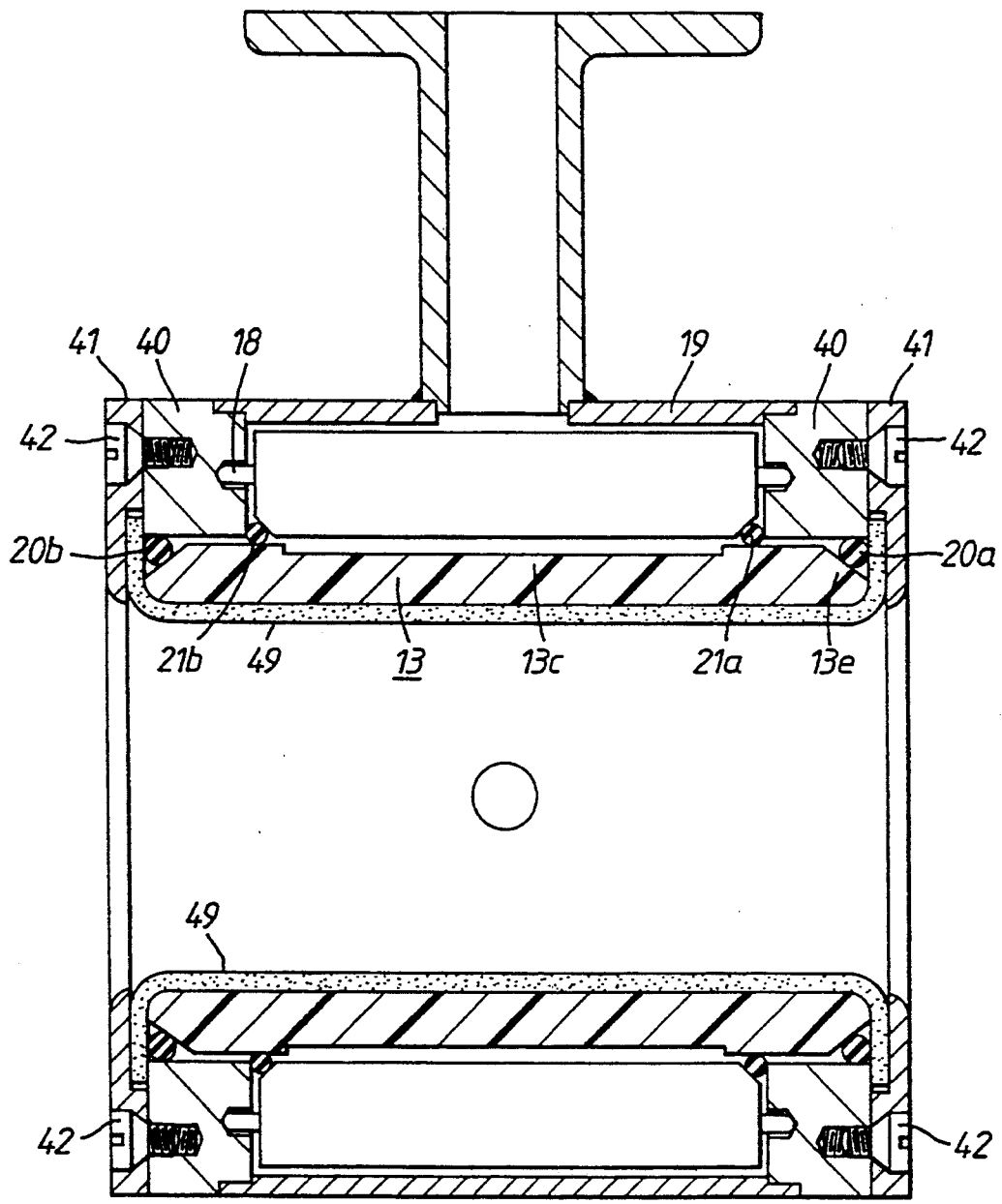
FIG. 12 is a sectional side view showing a sixth embodiment of the present invention.

A sixth embodiment will be described with reference to FIG. 12. The sixth embodiment is similar to the fifth embodiment. The shape of conduit 13 differs in that the fifth embodiment is configured with a short middle portion 13c, whereas the sixth embodiment is configured with a longer middle portion 13c.

In the sixth embodiment, the electromagnetic flowmeter has a more significant distinction in the overall length of conduit 13. Each of the previous embodiments included a 0.5 mm gap between the end faces 13d and 13e of conduit 13, and the inner surface of flanges 19a and 22 (or ground ring 41).

In contrast, the overall length of conduit 13 in the sixth embodiment is greater than in the previous embodiments. No 0.5 mm gap is present. The length of the housing is greater than the length of the conduit by an amount approximately equal to 2×the thickness of the ground ring. Referring to FIG. 12, it can be observed that end faces 13d and 13e abut teflon liner 49, which in turn abuts the inner surface of ground ring 41. Hence, a reduction in the longitudinal length of the housing under normal operating loads would appear to permit transmission of some slight axial compressive force to the conduit 13.

Next, a seventh embodiment will be described with reference to FIG. 13. The seventh embodiment comprises a cylindrical support (not shown), a housing 50 with a coil 50a, ground flanges 51a and 51b, and a conduit 52. The ground flanges 51a and 51b are attached at both ends of the case 50 by screws (not shown).

The conduit 52 is provided in a cylindrical space which is formed by the inner faces of housing 50 and ground flanges 51a and 51b. The conduit 52 has opposite tapered end portions 53a and 53b and a middle portion 53c. O-rings 54a and 54b are provided between the inner faces and the portions 53a and 53b. The O-rings 54a and 54b are made of an elastic material, such as rubber.

The caliber of housing 50 is larger than the external diameter of conduit 52. Further the length of conduit 52 is shorter than the distance between ground flanges 51a and 51b.

Figure 13:
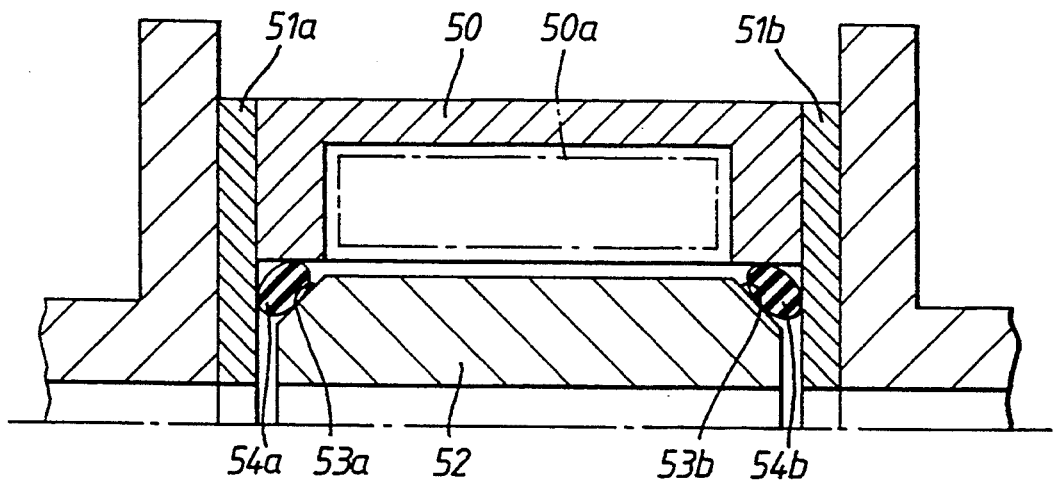
FIG. 13 is a partial sectional side view showing a seventh embodiment of the present invention.

Accordingly, as shown in FIG. 13, the O-rings 54a and 54b are provided with the portions 53a and 53b at both ends of conduit 52, respectively. The conduit 52 is held between ground flanges 51a and 51b under a preset pressure. A gap is formed between the surface of conduit 52 and the inner faces of housing 50 and ground flanges 51a and 51b.

If stresses such as compressive stress and bending stress act on the ground flanges 51a and 51b, the stress is transferred to housing 50. However very little stress acts on conduit 52. Consequently the stress does not serve to deform conduit 52.

When the temperature of fluid which flows through the conduit 52 changes rapidly, the shapes of conduit 52 and case 50 change under different expansion coefficients, respectively. However, once again, such a change in length of housing 50 will not affect conduit 52, because O-rings 54a and 54b provided between the conduit 52 and housing 50 absorb the effect due to the change in length of housing 50.

An eighth embodiment will be described with reference to FIG. 14.

Figure 14:
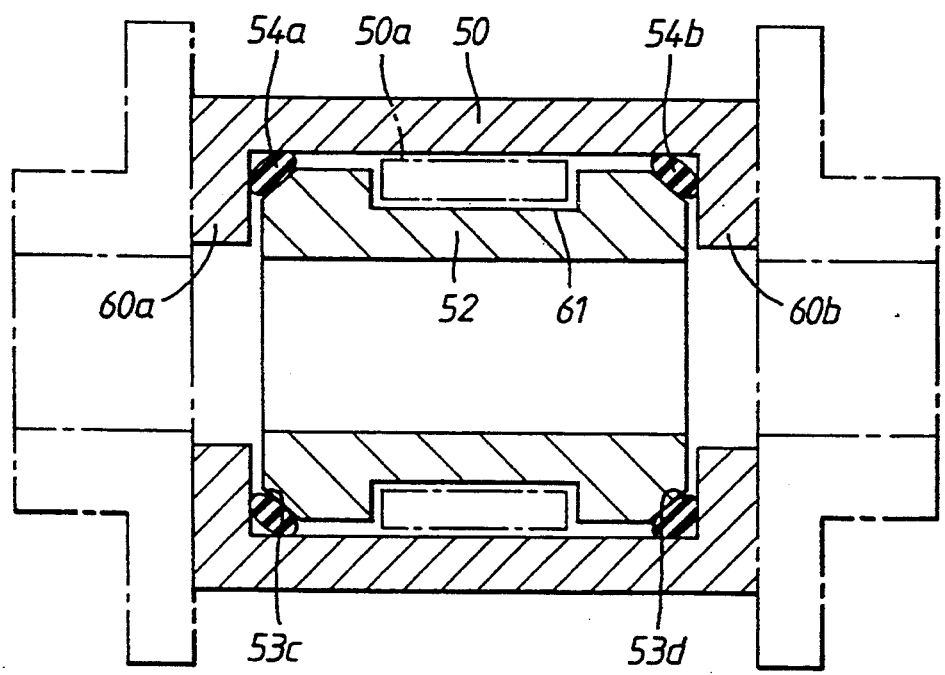
FIG. 14 is a sectional side view showing an eighth embodiment of the present invention.

As shown in FIG. 14, the housing 50 has extending ends 60a and 60b. The extending ends 60a and 60b have inner faces which act as ground flanges. Further the conduit 52 has a recess 61 for providing the coil 50a at the middle portion and opposite tapered end portions 53a and 53b. The tapered end portions 53a and 53b each have an end face 53c and 53d, respectively. O-rings 54a and 54b are provided between the extending ends 60a and 60b and end portions 53a and 53b of conduit 52.

Consequently, there is a gap between each inner face of extending ends 60a and 60b of housing 50, and the end faces 53c and 53d of conduit 52.

Figure 15A:
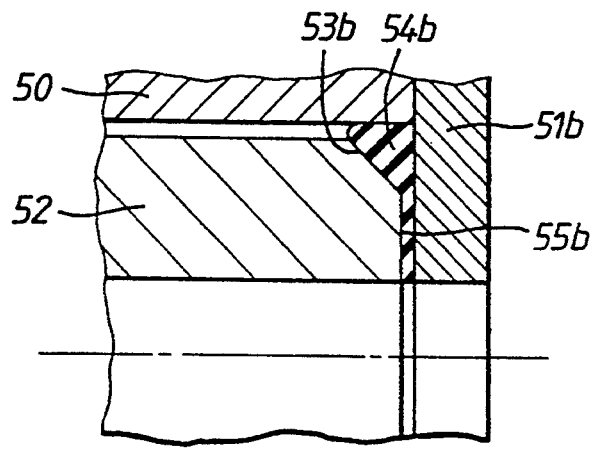
FIG. 15(a) is a partial cutaway sectional side view showing a ninth embodiment of the present invention.

A ninth embodiment will be described with reference to FIG. 15(a).

This embodiment is similar to the seventh embodiment with one exception. In the seventh embodiment, O-rings 54a and 54b are provided between the inner faces of housing 50 and the end portions 53a and 53b (see e.g. FIG. 12). In contrast, in the embodiment of FIG. 15(a), O-rings 54a and 54b are expanded to fill the space between the end faces 55a and 55b of conduit 52 and ground flanges 51a and 51b, respectively.

Figure 15B:
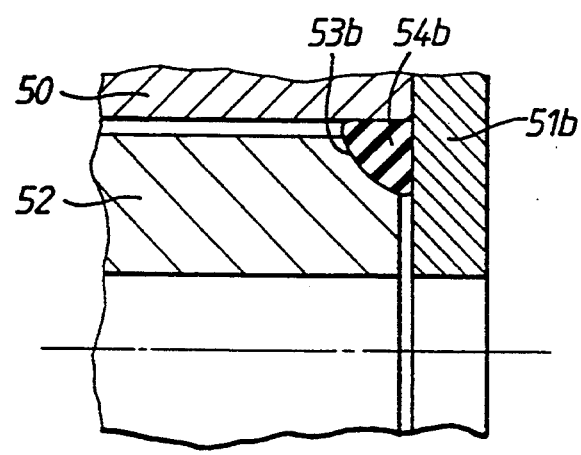
FIG. 15(b) is a partial cutaway sectional side view showing a tenth embodiment of the present invention.

A tenth embodiment will be described with reference to FIG. 15(b).

This embodiment is similar to the seventh embodiment with one exception. In the seventh embodiment, the surfaces of opposite tapered end portions 53a and 53b are flat. In contrast, in the embodiment depicted in FIG. 15(b) the end portions 53a and 53b are arcuate.

Figure 16:
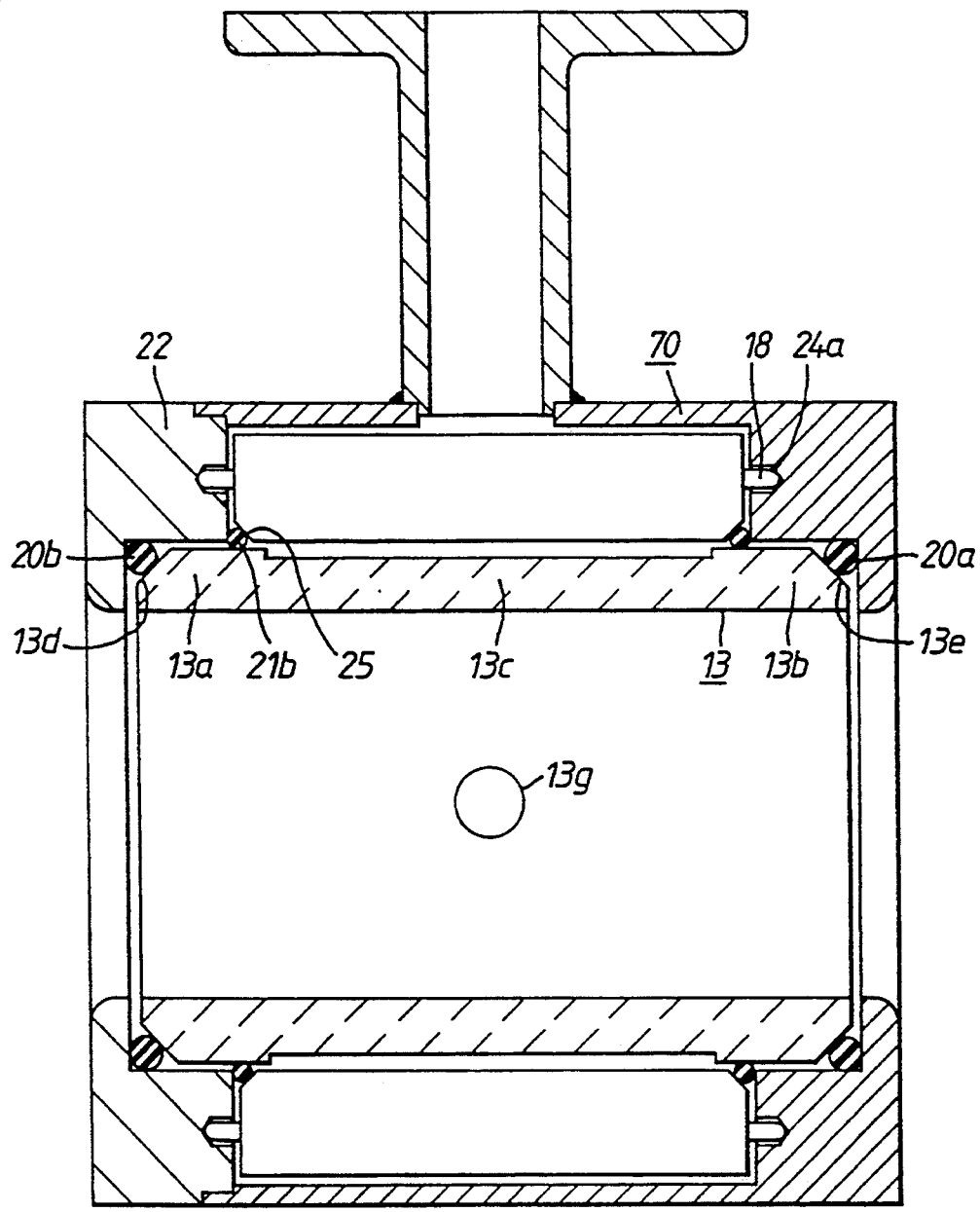
FIG. 16 is a sectional side view showing an eleventh embodiment of the present invention.

Further, an eleventh embodiment will be described with reference to FIGS. 16.

This embodiment is similar to the first embodiment with one exception. In the first embodiment, both flanges 22 and 19a are welded to the housing 19. In contrast, as shown in FIG. 16, in the eleventh embodiment flange 19a is replaced by a flange portion formed as a unitary part with housing 70. Flange 22 is still attached separately and welded. Consequently, the embodiment shown in FIG. 16 can be assembled quickly and easily.

An electromagnetic flowmeter having the features of the present invention, as described in the above embodiments, offers at least the following advantages.

The coils are fixed in place between the cylindrical casing and the magnetic path, which in turn are connected to flanges and fixed with bosses to the flanges of the housing. In the present invention, no compressive force need be applied by connection of the cores, as in the related art, to fix the coils in the proper position. Hence, the compression formerly applied by the coils is not present, and the conduit is not deformed.

The presence of the bosses further enables the flowmeter to be easily assembled, with the coils and flanges in the proper position, without use of special tools or skilled labor.

The cylindrical casing and magnetic path form an additional protective cover for the conduit, which is also not present in previous flowmeters.

The provision of a gap between the end faces of the conduit, and the lips of the housing flanges, maintained in part by the presence of O-rings, also serves to relieve the conduit from axial compressive loads applied by tightening of the pipe flanges. Once again, deformation of the conduit is prevented. Moreover, because the conduit is not subjected to compressive load, it does not have to be designed of a strong material, or provided with a stiffening liner.

Additional advantages and modifications will readily occur to those skilled in the art. Therefore, this invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An electromagnetic flowmeter comprising:
    a conduit having opposite end portions and a middle portion, and defining a path along a central axis for a fluid, the rate of flow of which is to be measured;
    a pair of electrodes positioned at opposite sides of the conduit;
    magnetic field generating means for generating a magnetic field in the conduit;
    a cylindrical case positioned coaxially around the conduit, and including flanges having extended bosses; and
    a cylindrical housing positioned coaxially around the case, housing the conduit, the case, and the magnetic field generating means, the bosses being inserted into the housing to position the magnetic field generating means, whereby the fluid flowing through the conduit induces a signal in the electrodes indicative of the flow rate.

2. An electromagnetic flowmeter as claimed in claim 1, wherein the housing has a first length in the axial direction, and the conduit has a second length in the axial direction which is less than the first length.

3. An electromagnetic flowmeter as claimed in claim 2, wherein a gap is defined between the conduit and the housing, and the flowmeter also includes an elastic ring in the gap.

4. An electromagnetic flowmeter as claimed in claim 1, wherein the cylindrical case includes electrical grounding means for grounding the flowmeter.

5. An electromagnetic flowmeter as claimed in claim 1, wherein the cylindrical case includes an insulating material.

6. An electromagnetic flowmeter as claimed in claim 1, wherein the end portions of the conduit have a diameter which is greater than a diameter of the middle portion of the conduit.

7. An electromagnetic flowmeter as claimed in claim 1, wherein the housing includes flange portions at each end thereof.

8. An electromagnetic flowmeter as claimed in claim 7, also including a weld between each flange portion and the housing.

9. An electromagnetic flowmeter as claimed in claim 7, also including a fastener between each flange portion and the housing.

10. An electromagnetic flowmeter as claimed in claim 7, wherein one flange portion is integral with the housing, and the flowmeter includes a weld between the other flange portion and the housing.

11. An electromagnetic flowmeter as claimed in claim 1, wherein the conduit includes a ceramic material.

12. An electromagnetic flowmeter as claimed in claim 1, wherein the conduit includes a plastic material.

13. An electromagnetic flowmeter as claimed in claim 12, wherein the conduit includes an inner surface and the flowmeter also includes a protective lining covering the inner surface of the conduit.

14. An electromagnetic flowmeter as claimed in claim 1, wherein each end portion of the conduit includes a tapered face portion.

15. An electromagnetic flowmeter as claimed in claim 1, wherein each end portion of the conduit includes an arcuate face portion.

16. An electromagnetic flowmeter as claimed in claim 1, wherein the magnetic field generating means includes at least one electric.

17. An electromagnetic flowmeter as claimed in claim 16, wherein the magnetic field generating means includes a core of ferromagnetic material.

18. An electromagnetic flowmeter comprising:
    a conduit defining a path along a central axis for a fluid, the rate of flow of which is to be measured;
    a pair of electrodes positioned at opposite sides of the conduit;

magnetic field generating means for generating a magnetic field in the conduit;

a cylindrical housing housing the conduit and the magnetic field generating means, the housing being coaxially positioned around the conduit, the conduit being spaced from the housing and the magnetic field generating means;

a cylindrical case positioned coaxially around and spaced from the conduit, the case including flanges having extended bosses for insertion into the housing for positioning the magnetic field generating means; and means for maintaining spacing between the conduit and both the housing and the magnetic field generating means, whereby the fluid flowing through the conduit induces a signal in the electrodes indicative of the flow rate.

19. The electromagnetic flowmeter of claim 18, wherein the means for maintaining spacing includes at least one elastic ring.

20. The electromagnetic flowmeter of claim 18, further including means for maintaining spacing between the conduit and the case.

21. The electromagnetic flowmeter of claim 20, wherein the means for maintaining spacing between the conduit and the case includes at least one elastic ring.

22. An electromagnetic flowmeter comprising:

a conduit having opposite end portions and a middle portion, and defining a path along a central axis for a fluid, the rate of flow of which is to be measured;

a pair of electrodes positioned at opposite sides of the conduit;

magnetic field generating means for generating a magnetic field in the conduit;

a cylindrical case positioned coaxially around the conduit, and including flanges in which recesses are defined; and a cylindrical housing positioned coaxially around the case, housing the conduit, the case, and the magnetic field generating means, the housing including bosses inserted into the recesses to position the magnetic field generating means, whereby the fluid flowing through the conduit induces a signal in the electrodes indicative of the flow rate.

* * * * *